June 3, 1941.  S. GRAHAM  2,244,148

AIRCRAFT TRAFFIC CONTROL SYSTEM

Filed Aug. 19, 1937   5 Sheets-Sheet 1

INVENTOR
STUART GRAHAM
BY J. D. O'Connell
ATTORNEY

June 3, 1941.　　　　　S. GRAHAM　　　　　2,244,148
AIRCRAFT TRAFFIC CONTROL SYSTEM
Filed Aug. 19, 1937　　　5 Sheets-Sheet 3
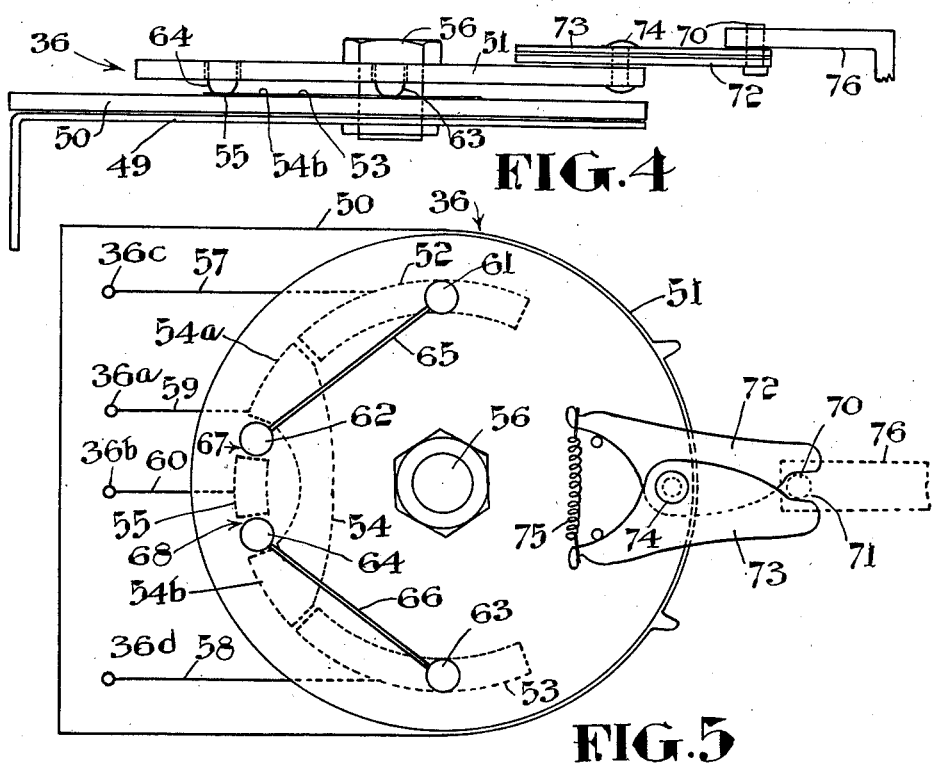
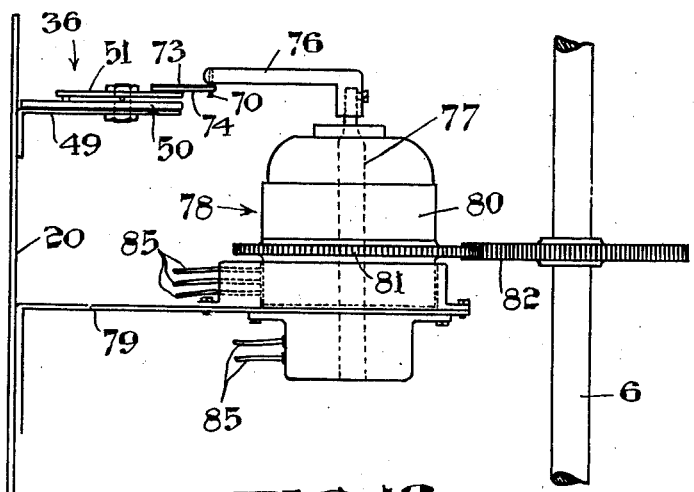
INVENTOR
STUART GRAHAM
BY J. D. O'Connell
ATTORNEY June 3, 1941.　　　　S. GRAHAM　　　　2,244,148
AIRCRAFT TRAFFIC CONTROL SYSTEM
Filed Aug. 19, 1937　　　5 Sheets-Sheet 4

INVENTOR
STUART GRAHAM
BY J. D. O'Connell
ATTORNEY

June 3, 1941.  S. GRAHAM  2,244,148
AIRCRAFT TRAFFIC CONTROL SYSTEM
Filed Aug. 19, 1937  5 Sheets-Sheet 5

INVENTOR
STUART GRAHAM
BY J.D. O'Connell
ATTORNEY

Patented June 3, 1941

2,244,148

UNITED STATES PATENT OFFICE 2,244,148

AIRCRAFT TRAFFIC CONTROL SYSTEM

Stuart Graham, St. Lambert, Quebec, Canada

Application August 19, 1937, Serial No. 159,949

2 Claims. (Cl. 177—352)

This invention relates to a traffic directing system for aircraft and comprises a system in which one or more traffic directing vanes are arranged to assume take-off or landing direction indicating positions in response to existing wind conditions or in response to the manipulation of suitable control mechanism located at a remote control station.

In my prior Patent 2,040,305, granted May 12, 1936, I have disclosed a traffic direction indicator for aircraft comprising a take-off or landing direction indicating vane which is normally free to position itself in accordance with existing wind conditions but is automatically returned to a predetermined set position when the velocity of the wind falls below a predetermined value.

One object of the present invention is to provide improved means for returning the vane to the predetermined set position in response to a drop in wind velocity or, alternately, in response to the manipulation of manually operable remote control means.

Another object is to provide means at the remote control station for automatically and continuously indicating the true position of the traffic direction indicating vane.

A still further object is to provide braking means whereby the vane may be held in any predetermined direction indicating position, said braking means being arranged to automatically release the direction indicating vane when the force of the wind or other external forces acting on the vane exceeds a predetermined value.

A still further object is to provide a traffic directing system which lends itself to the use of a plurality of auxiliary traffic direction indicating vanes operating in synchronism with a master vane which is positioned in accordance with existing wind conditions or in accordance with manipulation of suitable control mechanism provided at the remote control switch.

The foregoing and other objects of the invention, as well as the details of construction and operation, will be more readily apparent from the following description taken in connection with the accompanying drawings in which—

Fig. 4 is a side elevation of the essential elements of a reversing switch assembly forming part of the control system disclosed in Fig. 3.

Fig. 5 is a top plan view of the switch assembly appearing in Fig. 4.

Fig. 13 is an enlarged side elevation showing a part of the mechanism for controlling the operation of the reversing switch appearing in Figs. 4 and 5.

Figure 1:
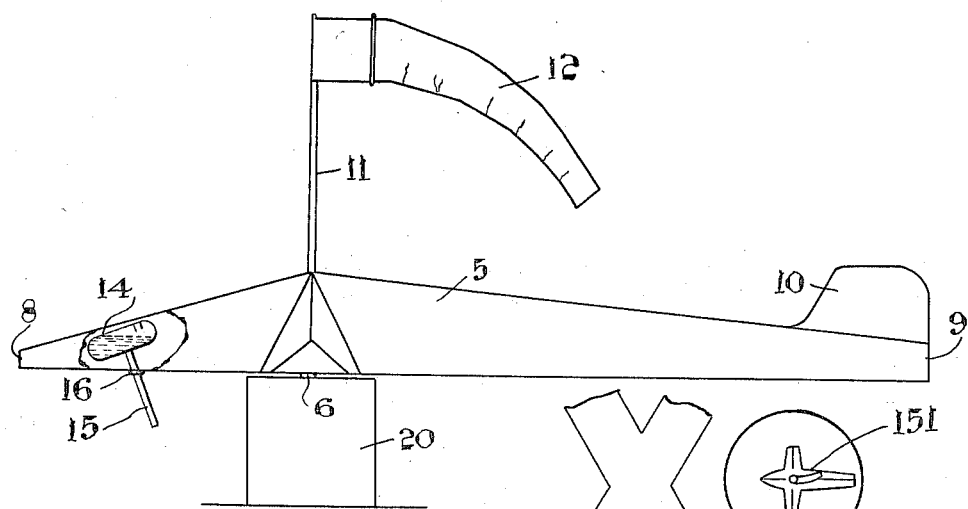
Fig. 1 is a side elevation of a traffic directing vane assembly provided in accordance with this invention.

Referring more particularly to the drawings, 5 designates a direction indicating vane fixed to a vertical shaft 6 which is normally free to rotate so that the vane may position itself in accordance with existing wind conditions. The vane is designed and mounted so that the end 8 will normally point into the existing wind. The opposite end 9, which is normally directed downwind, is equipped with a vertical fin 10. A staff 11 projects upwardly from the vane in line with shaft 6 and carries a conventional wind cone 12 which serves to indicate any difference between the true direction of the wind and the direction indicated by the vane. This indication is desirable since the vane is sometimes operated, in accordance with the present invention, to assume a cross wind landing or take-off indicating position. The vane is also equipped with a tiltably mounted mercury switch 14. This switch is shown fixed to a wind actuated flap 15 which is pivoted to the vane as indicated at 16. When the velocity of the wind is above a predetermined value, say, about four miles per hour, the flap 15 is inclined, as shown in Fig. 1, to tilt switch 14 to an open circuit position. When the velocity of the wind drops below said predetermined value, the flap 15 automatically assumes a position such that switch 14 is tilted to the closed circuit position shown in Fig. 3. As hereinafter explained, the closure of switch 14 serves to energize a motor 18 (Fig. 3), and to simultaneously establish a drive connection between said motor and the shaft 6 whereby vane 5 is automatically turned to a predetermined landing or take-off indicating position.

Figure 3:
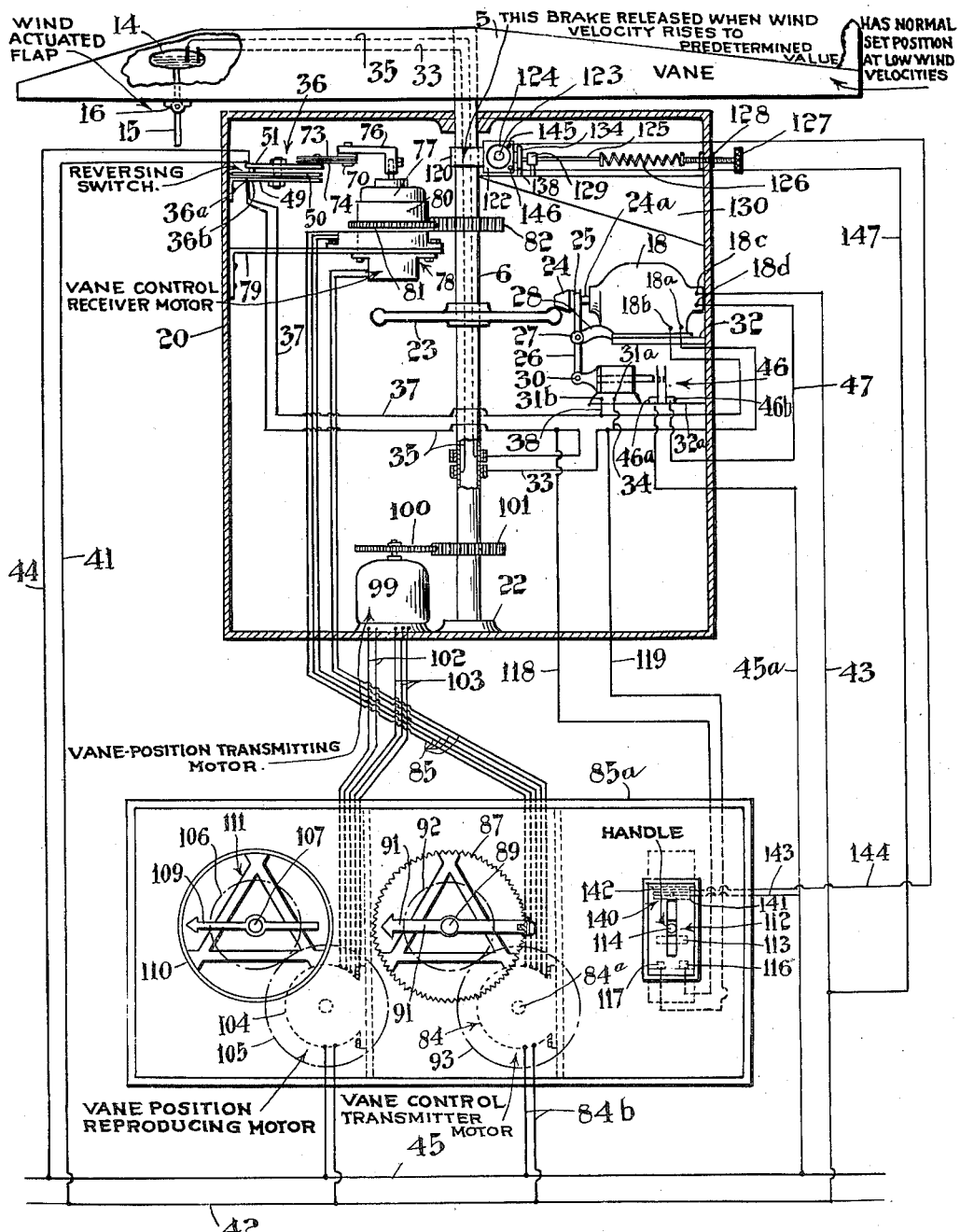
Fig. 3 is a schematic view showing the relative arrangement of the various mechanisms provided for controlling the positioning of the vane appearing in Figs. 1 and 2.

As clearly shown in Fig. 3, the lower portion of shaft 6 is rotatably mounted in a casing 20 by suitable upper and lower shaft bearings 21 and 22. This portion of the shaft carries a large bevel wheel 23 which is driven, at times, by a small bevel wheel 24 on the armature shaft 24a of motor 18. The driving wheel 24 is normally loose on shaft 24a but is adapted to be clutched thereto by the engagement of a sliding clutch member 25. The latter is automatically engaged and disengaged by a clutch shifting lever 26 intermediately pivoted, at 27, to a bracket 28 projecting from the base of motor 18. The upper end of lever 26 is suitably connected to clutch member 25 while the lower end is pivoted to the armature plunger 30 of an electro-magnet 31. The motor 18 and magnet 31 are supported in casing 20 by suitable supporting brackets 32 and 32a.

Terminal 14a of switch 14 is connected to the field terminal 18a of motor 18 by way of conductor 33 which is also connected, at 34, to terminal 31a of magnet 31. The remaining terminal 14b of switch 14 is connected, by way of conductor 35, to the output terminal 36a of a reversing switch 36. The remaining output terminal 36b of switch 36 is connected to the remaining terminal 18b of motor 18 by way of conductor 37 which is also connected, at 38, to the remaining terminal 31b of magnet 31. Input terminal 36c of reversing switch 36 is connected by conductor 41, to the supply main 42 which is also connected, by conductor 43, to the armature terminal 18c of motor 18. The remaining input terminal 36d of switch 36 is connected, by conductor 44 to supply main 45, which, in turn, is connected by conductor 45a to terminal 46a of a normally open switch 46. The remaining terminal 46b of switch 46 is connected, by conductor 47, to the remaining armature terminal 18d of motor 18. Switch 46 is arranged on bracket 32a so that it is automatically closed by plunger 30 when magnet 31 is energized to effect engagement of clutch 25.

The reversing switch 36 is mounted in casing 20 on a suitable supporting bracket 49 and is shown in detail in Figures 4 and 5. It comprises a stationary member 50 and a rotatable member 51. The member 50 is suitably fixed to the bracket 49 and is made of insulating material. This member carries the output terminals 36a and 36b and the input terminals 36c and 36d. It also carries four spaced stationary contacts 52, 53, 54 and 55. The contacts 52 and 53 are located at opposite sides of the central pivot 56 of the movable member 51. These two contacts are respectively connected to the input terminals 36c and 36d by conductors 57 and 58. The contact 54 is shaped and arranged so that one end 54a lies between the contacts 52 and 55 while the other end 54b lies between the contacts 55 and 53. Contact 54 is connected to output terminal 36a by conductor 59 while contact 55 is connected to output terminal 36b by conductor 60.

The movable switch member 51 is free to turn about the pivot 56 and carries four post contacts 61, 62, 63 and 64. The contacts 61 and 62 are electrically connected as indicated at 65 while the contacts 63 and 64 are similarly connected as indicated at 66. The contact post 61 always travels on the stationary contact 52 but the contact post 62 is movable into engagement with either of the stationary contacts 54 or 55, or may come to rest on an insulating area 67 lying between contact 55 and the end 54a of contact 54. Similarly the contact post 63 always travels on the stationary contact 53 while the connected contact post 64 may be engaged with either of the stationary contacts 54 or 55, or may come to rest on an insulating area 68 lying between contact 55 and the end 54b of contact 54.

It is obvious from this description that, by appropriate rotation of the switch member 51, the polarity of the output terminals 36a and 36b may be reversed to operate motor 18 in either direction. It is also obvious that when member 51 is rotated to the neutral position shown in Fig. 5, no current will flow from the input to the output terminals since the contact posts 62 and 64 are in the insulating areas 67 and 68. Consequently, in this position of the reversing switch, the motor 18 is disconnected from the supply mains 42 and 45 and will come to rest.

The rotatable member 51 of the reversing switch is actuated in either direction by a movable stud 70 which engages in an opening 71 formed between the outer ends of a pair of levers 72 and 73 mounted in overlapping relation on a pivot 74 carried by member 51, the inner ends of said levers being connected together at their inner ends by a spring 75. Stud 70 is carried by a crank arm 76 fixed to rotate with the rotor 77 (Figs. 3 and 13) of a self-synchronous type position reproducing motor receiver 78. The receiver 78 is supported on a bracket 79 in casing 20 so that both the rotor 77 and the stator 80 are free to rotate about a common vertical axis. The stator 80 is geared to the vane shaft 6 by gears 81 and 82 of even ratio. The position of the rotor 77 relative to the stator 80 is definitely controlled by the self-synchronous motor transmitter 84 which is synchronized with the receiver 78 by suitable electrical connections 85. The connections between the transmitter 84 and the supply mains 42 and 45 are indicated at 84b and are made in the usual manner.

Figure 6:
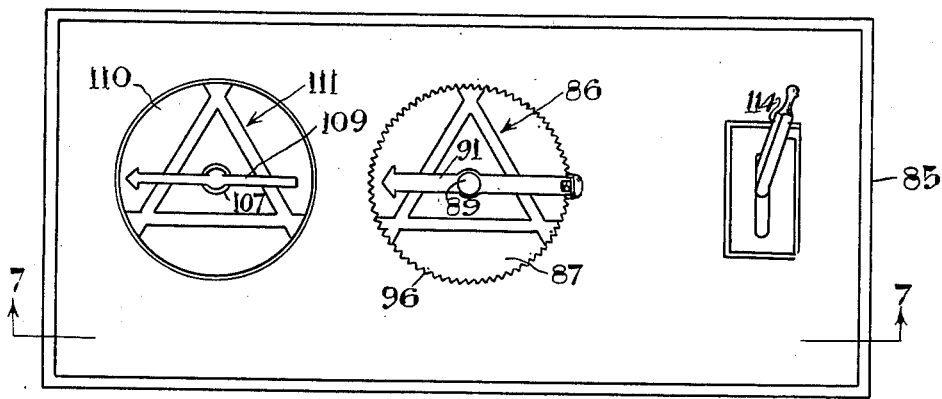
Fig. 6 is a top plan view of a casing containing certain control devices which are located at a control station remote from the vane itself.
Figure 7:
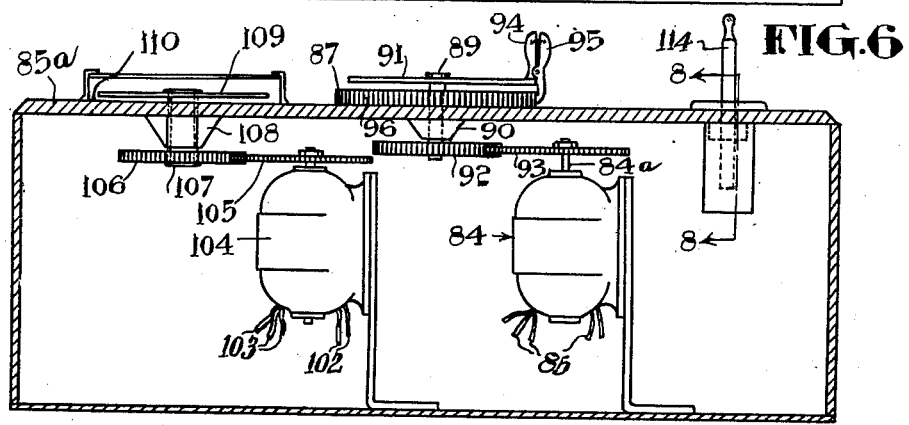
Fig. 7 is a longitudinal sectional view through the casing appearing in Fig. 6.

As shown more particularly in Figs. 6 and 7, transmitter 84 is suitably mounted in a casing 85a located at a control station or tower remote from the vane 5. As indicated at 86, a sketch of the air port is displayed on a dial 87 fixed to the top wall of casing 85a. A vertical spindle 89 passes centrally through dial 87 and is mounted to rotate in a suitable bearing 90 located in casing 85a. The upper end of the spindle carries an indicating needle 91 while the lower end is geared to the rotor 84a of the transmitter 84 by gears 92 and 93. Needle 91 is provided with a handle 94 whereby the needle and the rotor 84a may be turned to any position relative to the runways shown on the sketch 86. A spring actuated latch 95, carried by the handle 94, is adapted to engage the toothed periphery 96 of the dial 87 to retain the needle 91 and rotor 84a in any desired position. The setting of the transmitter 84 by the needle 91 determines the position to which the vane 5 is returned by the motor 18 during operation of the latter.

A self-synchronous Selsyn type transmitter motor 99 is mounted in casing 20 and is geared to the vane shaft 6 by gears 100 and 101 of equal ratio. The rotor and stator elements of this transmitter are electrically connected as indicated at 102 and 103 to the rotor and stator elements of a Selsyn type position reproducing receiver motor 104 mounted in control casing 85a. The rotor of the receiver 104 is connected by gears 105 and 106 to the lower end of a spindle 107 which extends upwardly through the top of casing 85a and is rotatably mounted in a suitable bearing 108. An indicating needle 109 is fixed to the upper end of spindle 107 and lies directly above a dial 110 on which a sketch of the air port is displayed as indicated at 111. When the vane 5 and the indicating needle 109 are properly synchronized any heading of the vane relative to the air port will be indicated by the turning of the needle 109 to the same position relative to the sketch of the air port displayed on the dial 110. The needle 109 thus serves as a true position indicator of the vane 5.

Figure 8:
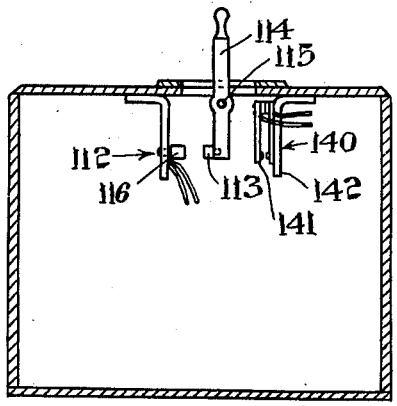
Fig. 8 is a sectional view taken substantially along the line 8—8 of Fig. 7. In this view certain parts, which would otherwise appear, have been omitted for the sake of clearness.
Figure 9:
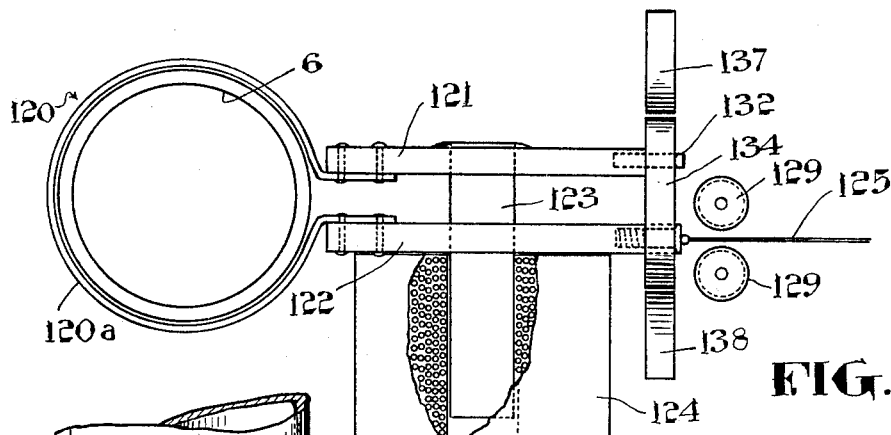
Fig. 9 is an enlarged plan view of a brake assembly which is employed to hold the direction indicating vane in a predetermined position.
Figure 10:
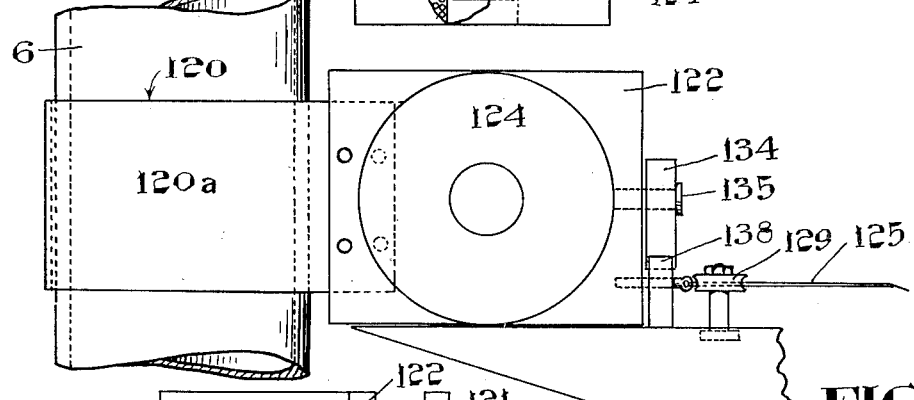
Fig. 10 is a side elevation of the assembly appearing in Fig. 9.
Figure 11:
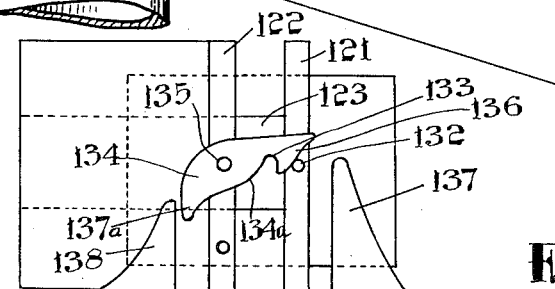
Fig. 11 is a view showing the brake assembly as it appears when looking toward the right hand side of the assembly appearing in Fig. 10.
Figure 12:
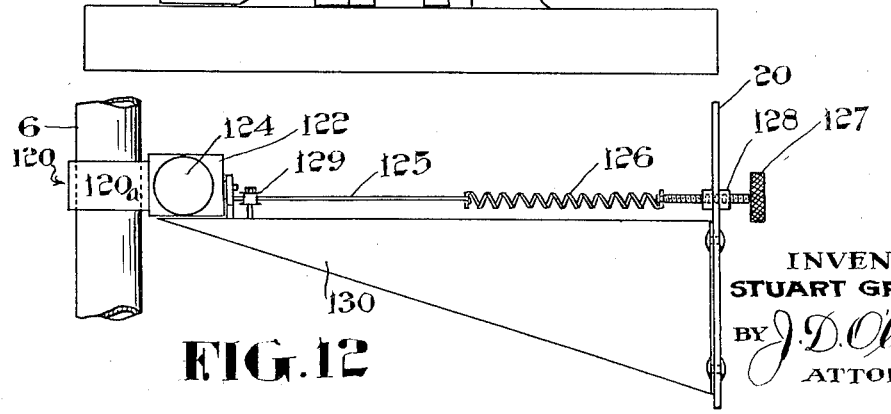
Fig. 12 is a view similar to Fig. 10 but showing certain additional parts.

The field of the vane operating motor 18 may be energized independently of the wind actuated switch 14 by manual closure of a suitable control switch indicated at 112 in Figs. 3 and 8. The movable contact 113 (Fig. 8) of switch 112 is carried by the inner end of a lever 114 which is pivoted to the casing 85a as indicated at 115. This movable contact 113 is adapted to bridge stationary contacts 116 and 117 of switch 112 when the lever 114 is swung in one direction. The contacts 116 and 117 are connected through the switch 14 as indicated at 118 and 119 in Fig. 3.

The operation of the various parts previously referred to may be briefly reviewed as follows:

The needle 91 is set in a definite position relative to the runways depicted on the dial through the gears 92 and 93, to set the transmitter 84 so that the reversing switch 36 will be operated to the neutral or open circuit position shown in Fig. 5 when motor 18, after being energized by closure of the switch 14, has returned the vane 5 to a position relative to the runways of the air port which corresponds to the set position of the needle 91. The position to which the vane 5 is actually returned by the motor 18 is indicated at the control station by the needle 109. If the parts are operating correctly the needle 109 will assume a position relative to the runways of the sketch 111 which is the same as the position assumed by the needle 91 relative to the runways of the sketch 86. The setting of the control needle 91 is usually such that, when the wind velocity drops below a predetermined value, the vane 5 will be returned to a position indicating the direction of the longest or most desirable runway on the air port, and in this position the movable contacts 62 and 64 of the reversing switch 36 will rest on the insulated areas 67 and 68, thereby deenergizing switch magnet 31 and motor 18. Under these conditions the shaft 6 is free to rotate independently of motor 18 so that vane 5 may position itself in accordance with existing wind conditions. A suitable spring (not shown) is provided for operating the plunger 30 of magnet 31 in a clutch disengaging direction when the magnet is deenergized.

The operator may take over control of vane 5 at any time by operating the lever 114 to close the switch 112. When this switch is closed the field of the motor 18 is energized independently of the wind actuated switch 14. As soon as the switch 112 is closed the vane 5 will be immediately returned by motor 18 to a predetermined set position depending upon the setting of the control needle 91. It will thus be seen that by changing the setting of the needle 91 and closing the switch 112 the operator may cause the vane 5 to turn to any desired position relative to the runways of the air port.

It is sometimes desirable to retain the vane 5 in a given position until the wind pressure or external forces acting on the vane exceed a predetermined value. This may be accomplished through the agency of the vane position retainer generally indicated at 120, (Figs. 3, 9, 10, 11 and 12). This device comprises a metallic brake band 120a around shaft 6 and having its opposite ends fixed to a pair of relatively movable plates indicated at 121 and 122. The plate 121 is fixed to the movable plunger 123 of an electromagnet 124 mounted on the plate 122. When the magnet 124 is energized the plunger 123 is moved to tighten the brake band around the shaft 6. In this position of the parts the brake assembly comprising the band 120a, plates 121 and 122, and magnet 124, tend to rotate with the shaft 6 but are restrained by a cable 125 having one end attached to the plate 122 and the other end attached to a restraining spring 126 which is tensioned by an adjusting screw 127 in threaded engagement with a threaded member 128 rigidly attached to a wall of casing 20. The cable 125 is confined between a pair of idler rolls 129 mounted on a bracket 130 which also extends beneath the plates 121 and 122 of the brake assembly. As the plates 121 and 122 are drawn together by the magnet 124, a pin 132 on plate 121 is automatically engaged in the notch 133 of a latch 134 which is intermediately pivoted to plate 122 as indicated at 135. The plates 121 and 122 are thus locked in a brake applying position and the brake assembly is thus effective to hold the shaft 6 stationary until the wind pressure or external forces acting on the vane are sufficient to overcome the restraining force of the spring 126. When this occurs the plates 121 and 122 move either to the right or left as viewed in Fig. 11. If they move to the right the nose 136 of the latch 134 rides over a member 137 which automatically lifts the latch out of locking engagement with the pin 132, thus releasing the braking pressure on the shaft 6. If the plates 121 and 122 move to the left in the applied position of the brake the tail portion 137a of the latch 134 engages a member 138 which serves to swing the latch out of locking engagement with the pin 132 to effect releasement of the shaft 6. The magnet 124 is energized by closure of the switch generally indicated at 140 in Fig. 3. As shown more particularly in Figure 8, this switch 140 comprises a pair of normally spaced contacts 141 and 142 which are pressed together by the lower end of the lever 114 when this lever is swung in the proper direction. The contact 141 (see Fig. 3) is connected to conductor 45a as indicated at 143 while the companion contact 142 is connected by conductor 144 to the terminal 145 of magnet 124. The remaining terminal 146 of magnet 124 is connected to conductor 43 as indicated at 147.

After the brake band 120 has been tightened around the shaft 6, as previously described, the latch 134 may also be released from locking engagement with the pin 132 by a momentary reclosure of switch 140. The magnet 124 being energized by this reclosure of switch 140 attracts the plunger 123 so that the pin 132 moves against the curved edge 134a of the latch and raises the latter to a position above the pin. As the switch 140 is opened to again deenergize the magnet the spring band 120a quickly springs to a brake releasing position and moves the pin 132 outwardly beyond the nose of the latch 134 before the latch has time to again drop into locking engagement with said pin.

Figure 14:
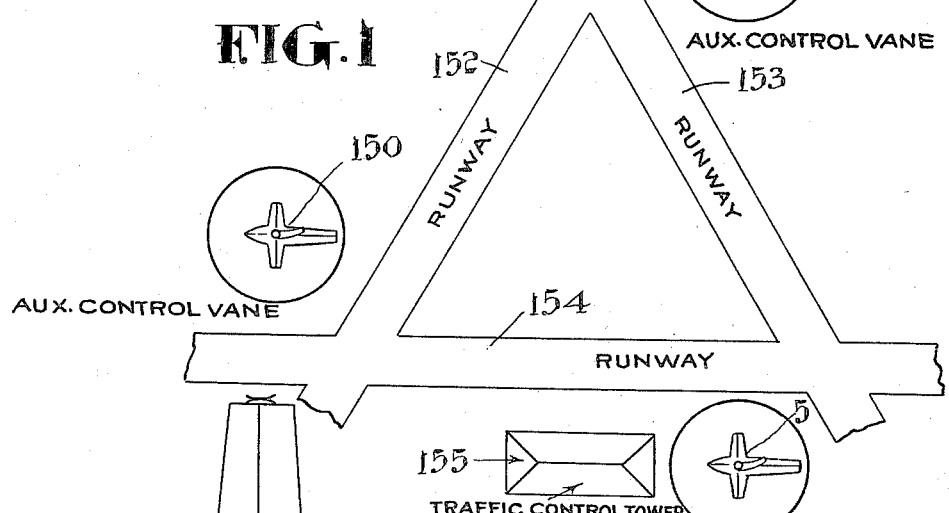
Fig. 14 is a view showing a proposed arrangement in which auxiliary control vanes are synchronized with the master control vane in accordance with the present invention.
Figure 2:
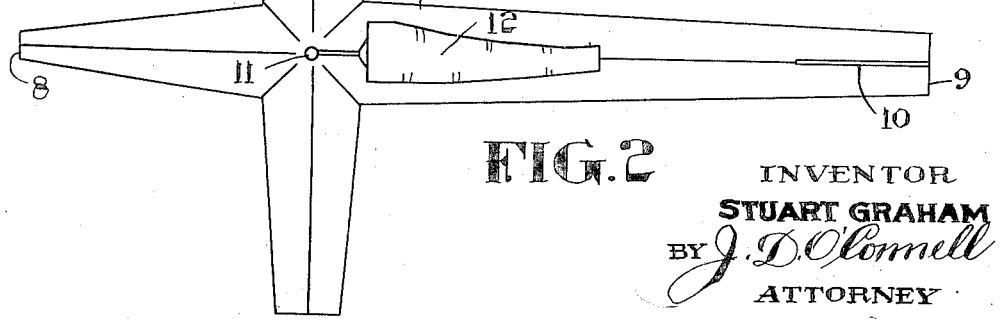
Fig. 2 is a top plan view of the assembly appearing in Fig. 1.

The control mechanism provided in accordance with this invention lends itself to the adoption of a traffic control system in which auxiliary vanes are synchronized with the master vane 5 so that, as the several vanes rotate, their longitudinal axes will remain parallel and their headings similar. In Fig. 14 I have shown a schematic view of an air port equipped with auxiliary traffic directing vanes 150 and 151 located adjacent the runways 152, 153 and 154 and are intended to be synchronized in any well known manner with the master vane 5, which is located in any suitable position and is controlled from the remote control tower 155 by the control mechanism previously described in connection with Figs. 1 to 13 inclusive. The vanes 150 and 151, being synchronized with the master vane 5, will assume positions relative to the runways corresponding exactly to the position assumed by the vane 5. In this case true position indicators, such as shown in Fig. 7, will ordinarily be provided at the control tower 155 so that the operator there will know whether the several vanes are working in true synchronism.

Having thus described my invention, what I claim is:

1. In a traffic directing system for aircraft, the combination with a rotatably mounted wind vane normally free to position itself in accordance with prevailing wind conditions of means for returning said vane to a predetermined set position when the velocity of the wind falls below a predetermined value, said means comprising an electric motor, a drive connection between the motor and the vane including a normally disengaged clutch, a normally closed wind operated switch in the field circuit of said motor, said switch being carried by said vane and being opened by wind pressure when the latter exceeds a predetermined velocity, a current reversing switch included in the field circuit of the motor in series with the wind operated switch, the cooperating stationary and movable contacts of said reversing switch being normally positioned in circuit opening relation to disrupt the field circuit of the motor and means for operating the movable contacts of said reversing switch in response to rotation of said vane, said means serving to engage the cooperating contacts of the reversing switch to establish suitable circuit connection for energizing the motor for returning the vane to said predetermined position, a normally open armature energizing switch included in the armature circuit of said motor and means functioning, in response to closure of the wind operated switch and the reversing switch, to close said armature energizing switch, said means also serving to effect automatic engagement of said clutch to establish a drive connection between the motor and the vane.

2. A traffic directing system for aircraft as recited in claim 1 in which the last mentioned means comprises a solenoid having a movable core adapted to close the armature controlling switch when said solenoid is energized by closure of the wind operated switch and the current reversing switch, and a connection between the solenoid core and said clutch whereby the latter is engaged by movement of said core when the solenoid is energized as aforesaid.

STUART GRAHAM.